United States Patent Office 3,016,800
Patented Jan. 16, 1962

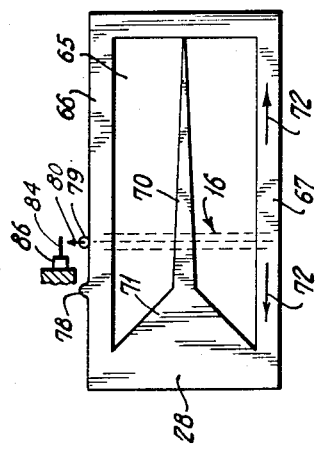
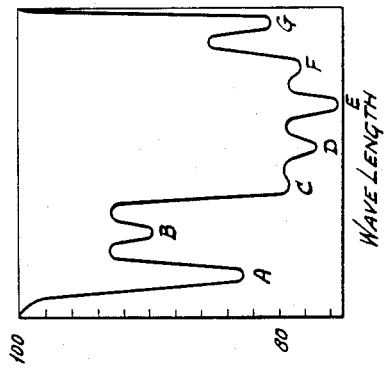
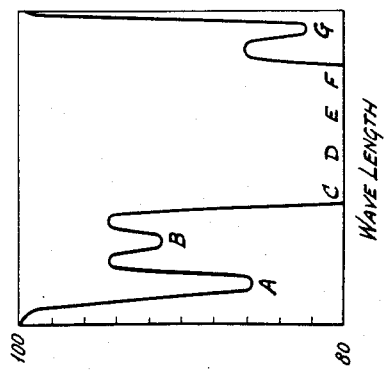
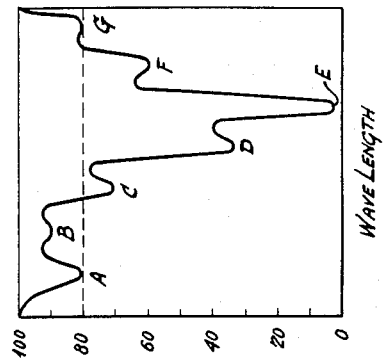

3,016,800
**WEDGE FOR A DOUBLE BEAM SPECTRO-
PHOTOMETER**
William A. Pliskin, Poughkeepsie, N.Y., assignor to
Texaco Inc., a corporation of Delaware
Filed July 3, 1958, Ser. No. 746,530
6 Claims. (Cl. 88—61)

This invention is concerned with double beam spectrophotometrs in general. More specifically it is concerned with an improvement in the wedge employed in such a spectrophotometer.

In a double beam spectrophotometer, a so called wedge is employed in order to vary the percentage of energy in one of the beams, over a range that is to be expected, so as to be able to match the energy that is transmitted by the other beam. Heretofore, such range of the percentage of energy transmission, has been the full variation of one hundred percent to zero percent. However, it has been suggested that an investigation of less than the full percentage range might be had to provide an amplified indication, by employing a wedge that varies the percentage of energy in the one beam from a given percentage, e.g. one hundred percent, to a predetermined lesser percentage, such as something in the order of twenty percent or less. When such an amplification photometer arrangement is employed, the indications that lie outside of the predetermined range of percentages are completely lost. For instance, in the example mentioned above, the indication of any percentage below eighty percent will merely indicate as zero, i.e. the base line of the photometer indications.

Consequently it is an object of this invention to provide a wedge having a construction such that the full range of zero to one hundred percent energy transmission may be employed, while at the same time an amplified indication of part of the range may be had.

Another object of the invention is to provide a system that employs a wedge structure, for a double beam spectrophotometer, such that combined range may be had. Thus, the structure is such that it gives amplified indications over a predetermined short portion of the full range, as well as an indication of the percentages of energy involved, in the remainder of the range. In addition it is contemplated that the system will include an arrangement for providing a shift in the gain of the system, in order that the indications for both ranges involved may be satisfactorily carried out without difficulties.

The invention may be briefly described as being concerned with some of the elements in a double beam spectrophotometer, having a graduated opening in the path of one beam for preventing the passage of a predetermnied percentage of the energy in said beam depending upon the relative position of said opening and said beam. The said opening of the system has a full range of dimensions such that maximum and minimum percentages of energy passed therethrough are one hundred percent and zero percent respectively. In such a photometer system, the invention is concerned with the combination of a parallel sided boundary configuration for said opening, and wedge shaped opaque panel extending longitudinally from the one hundred percent end of said opening toward the other end thereof. The combination also includes the feature that the maximum width of said panel is only a relatively small percent of the distance between the parallel sides of said boundary. Furthermore, the length of said panel is a substantial amount of the full length of said boundary configuration, so that the readings of said spectrophotometer are amplified in a predetermined range of percent energy passed. This range is equal to the percentage of said panel width, relative to said distance between said parallel sides. The combination also includes a tapered opaque panel connected to the other end of said wedge shaped panel. The said tapered panel extends all the way to the zero percent end of said opening. In addition the tapered panel has a maximum width equal to the distance between the parallel sides of said boundary, so that the readings of said spectrophotometer include the full range of percent energy passed. Thus the said tapered panel covers the remainder of the full range, outside said range of readings that are amplified.

A preferred embodiment of the invention is described in some detail below and is illustrated in the drawings, in which:

FIG. 2 is an elevation of a wedge structure plus some schematically indicated elements added thereto;

FIG. 3 is a graph illustrating the results of a particular run taken from the operation of a spectrophotometer employing a standard type wedge that is graduated linearly from zero to one hundred percent;

FIG. 4 is another graph, illustrating the results of a run of the photometer that was taken while employing amplification by reason of a wedge that only includes the upper twenty percent; and FIG. 5 is a graph showing the results of a run with the spectrophotometer using a compound wedge structure, in accordance with this invention.

Figure 1:
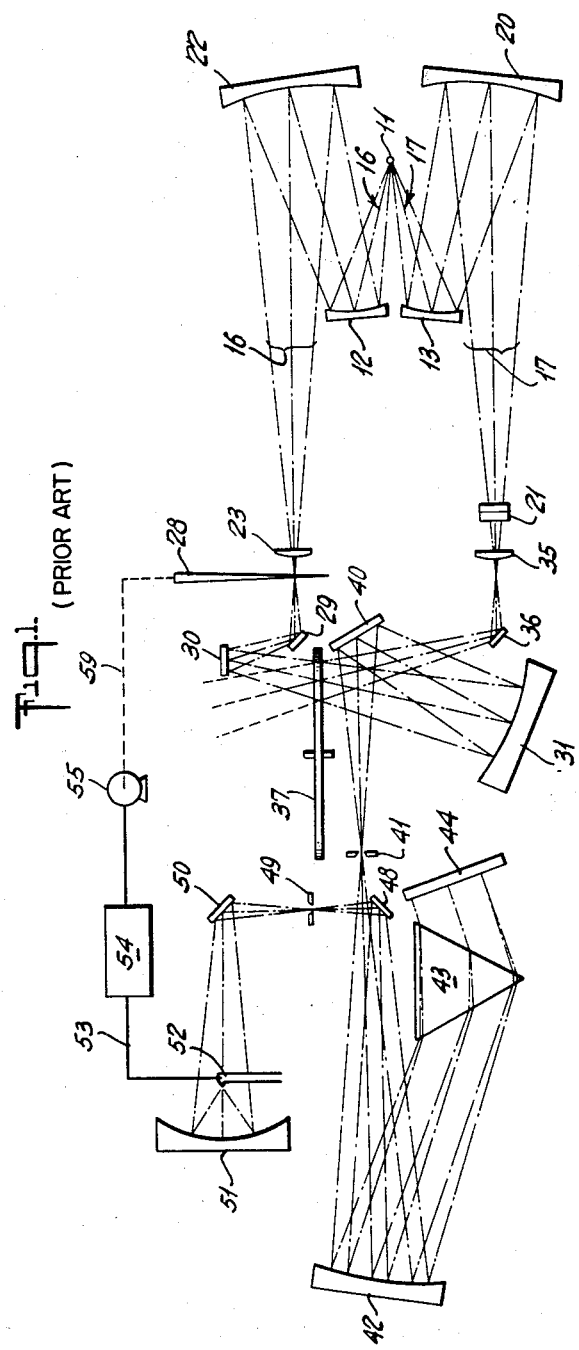
FIG. 1 is a schematic diagram, largely concerned with the optical system, but including some of the mechanical elements.

In spectrophotometry in general, measurements are made of a sample that is affected by a beam of electromagnetic energy in the range of frequencies at or near light energy. Certain particular investigations are carried out in the range of so-called infrared frequencies. More particularly, in certain studies involving infrared energy absorption investigations, it has been found desirable to employ an arrangement such that the indications may be amplified for small changes in absorption over a given range of frequencies being investigated. Sometimes these investigations involve a situation where the absorptions become greater than the maximum which may be amplified, so that the instrument indications are lost off scale with a standard arangement for amplifying the percent transmission indications. Such a situation is illustrated by the FIG. 4 graph.

It has been discovered that by employing a wedge structure in accordance with this invention, the benefits of amplification may be had, and in addition an indication of those absorptions that fall outside of the limited absorption range being amplified, may also be obtained.

Referring to FIGURES 1 and 2 it is pointed out that there is shown schematically the principal elements of a system that is included in one type of a double beam spectrophotometer. Such a photometer has a source of energy 11, that may take any feasible form, e.g. a Nernst glower for generating infrared energy. A pair of beams of infrared energy are emitted from source 11 to impinge upon a pair of concave reflectors 12 and 13. These beams are indicated by three dashed lines in each case and are designated as a beam 16 and a beam 17, respectively. The beam 17 is directed from reflector 13 to another concave reflector 20, and from there is focused as it is directed to pass through a sample 21. The other beam 16 is directed from the reflector 12 to another reflector 22 (that corresponds to reflector 20) and from there beam 16 is directed to a lens 23. The structure is such that the two beams 16 and 17 are substantially equal in size and consequently have relatively equal energy in each.

On the other side of the lens 23, close to a focal point of the beam 16, there is an optical wedge 28. The wedge 28 acts to attenuate the amount of energy in beam 16 that is allowed to pass through the wedge in order to equalize with the energy of beam 17 that passes through the sample 21.

In FIGURE 1 the wedge 28 is shown schematically as a wedge shaped element. The actual structure of the wedge is in the form of a window, as illustrated in the elevation view that is shown in FIGURE 2. The details of this window structure will be described in more detail below.

After the beam 16 passes wedge 28 it is reflected from a reflector 29 upward (as viewed in FIGURE 1) to another reflector 30. From reflector 30 the beam 16 is reflected downward to a concave reflector 31, that acts as a common reflector for both of the beams 16 and 17, alternately.

Beam 17 is directed through a lens 35, after it has passed the sample 21. Then the beam impinges upon reflector 36. From reflector 36 the beam is directed upward, either to be lost in space or to be reflected from the lower surface of a rotating sector mirror 37. Thus, during half of each revolution of the sector mirror 37, beam 17 strikes the reflecting surface of the mirror 37 and is directed downward onto the concave reflector 31. At the same time the beam 16, which was being directed onto the same concave reflector 31, is intercepted by the sector mirror 37. During the other half of a revolution of mirror 37, it does not intercept the beam 16 and consequently the beam 16 is directed from the mirror 30 onto reflector 31, while the beam 17 is directed from the mirror 36 off into space.

The path of beams 16 and 17 thus becomes a common one as they are directed onto the surface of the concave reflector 31, in alternation. This common path may be followed from the concave reflector 31 upward to a reflector 40. From the reflector 40, the beams are directed through a slit 41 to a concave reflector 42. Then from reflector 42 the beams are directed to pass through a prism 43. Prism 43 bends the beams as they pass therethrough and directs them against a plane surfaced reflector 44. This bending is caused by refraction, which also causes a dispersion of the different wave lengths of the energy in the beams. The beams are then returned from the reflector 44 and further dispersed as they again pass back through the prism 43. The dispersed and rebent beams are directed against the concave reflector 42 once more, and this time (by reason of the difference in their angular paths) are directed onto a plane reflector 48 which directs them upward (as viewed in FIG. 1) to a slit 49 in order to selectively pass only a given desired wave length. It is pointed out that the slit 49 is arranged for transverse movement relative to the axes of the dispersed beams, substantially at a focal point so that the desired wave length (or frequency) of the alternate beams 16 and 17, may be selected.

The selected wave length of energy continues onto the surface of another plane reflector 50. From there, this energy is then directed so as to be reflected from a concave focusing reflector 51 onto a thermocouple element 52, that is situated at the focal point of the reflector 51.

In order to provide an indication of the percentage absorption of energy that exists for the selected wave length, the output of thermocouple element 52 is carried over an electrical circuit (indicated by line 53) and employed to control energization of a motor 55 which is in turn under control of a control circuit 54. The motor control circuit 54 controls energization of the electric motor 55 for reversible operation, and motor 55 is connected mechanically to the wedge 28 as indicated by a dashed line 59. Thus the position of the wedge 28 is made to correspond to the percentage of energy of the beam 17 that is absorbed by the sample 21, at any given wave length, as determined by the setting of the slit 49. The indication is therefore directly related to the mechanical output of the motor so that any feasible drive for a recording pen (not shown) or the like, may be used. The indication may take the form of a graph, e.g. like that shown in FIG. 3, where the percent energy transmitted by the sample 21 is plotted against the wave lengths that are of interest for the particular substance being investigated.

It may be noted that the arrangement is such that the motor 55 continuously adjusts the wedge 28 to a corresponding position for the percentage of energy being absorbed, but it remains at rest so long as the corresponding position is obtained. This is because the output of the thermocouple 52 is either an A.C. signal of one phase or the opposite phase, whenever the energy level is different between the alternate beams 16 and 17. But, so long as the energy levels are the same, the A.C. signal becomes zero and the motor 55 stops. The phase of the A.C. signal reverses whenever the difference in energy level shifts from: a difference with the beam 16 as the larger, to the opposite condition when the difference is with the beam 17 larger.

Referring to FIGURE 2 it will be observed that the wedge 28 is in the form of a window, that is constructed of a sheet of opaque material having a solid border that encloses an open portion, or window 65. Window 65 is formed with an upper and lower border strip 66 and 67, respectively. The inside edges of border strips 66 and 67 form parallel sides for the window 65.

Longitudinally across the center of the window 65, there is an opaque wedge shaped panel 70, and a tapered panel 71 that connects the wide end of the wedge shaped panel 70 with the left-hand edge (as viewed in FIGURE 2) of the window 65. It will be noted that even though the point of the wedge-shaped panel 70 is shown in FIGURE 2 touching the side of the window 65, obviously this need not be the case. In any event the percentage of energy passed at this end of the window is substantially one hundred percent.

It is pointed out that as the wedge structure 28 is moved by the motor 55, it is positioned longitudinally as indicated by a pair of arrows 72. This means that the relative position of the beam 16 moves transversely across the window 65 from one end to the other, depending upon the position of the wedge structure 28. Consequently a predetermined percentage of the energy in the beam 16, which would pass through the window 65 if it were unobstructed, is blocked or removed by the opaque panels 70 and 71 in order that a balanced condition may be reached, as described above in connection with the entire double beam photometer system. It will be noted that the beams in cross section take the form of vertically disposed, long thin pencils of energy. This is because the source in the Nernst glower has a vertical, elongated element that emits the infrared energy.

Referring to FIGURES 3 and 4 it is pointed out that under prior art arrangements, a particular substance might have a characteristic curve over a given spread of wave lengths that looks like the curve illustrated in FIGURE 3. The wedge employed (not shown) would have provided a linear variation, in the energy transmitted through the window, of one hundred percent to zero. It will be observed that on this curve the variations in percentage transmission of the energy, range from one hundred percent to very nearly zero, and back. Now according to prior art suggestions, the indications for a given portion of the percentage range of transmission may be amplified, e.g. the eighty to one hundred percent range, and a result such as illustrated in FIGURE 4 would be had. Such a curve would be obtained by a wedge having its window shape (not shown) such that one hundred percent transmission would be allowed at one end of the window and only eighty percent transmission allowed at the other end of the window. It will be noted that under such conditions the variations of the upper twenty percent are amplified to a great extent; but, the portions of the transmission of energy range that are below eighty percent transmission, are entirely lost. This is because the window remains positioned at the no transmission end thereof so long as the percent transmission is eighty percent or less. Thus, referring to the high absorption (inverse of transmission) peaks that are indicated on FIGURES 3 and 4, by capital letters A through G, it will be noticed that absorption peaks A, B and G remain clearly observable and quite magnified in FIGURE 4. However, at the same time the high absorption peaks C, D, E and F are completely lost in the FIGURE 4 graph, and their relative or indicated values do not register.

By making use of this invention, an amplified, or magnified graph indicating the absorption peaks over a predetermined range of percentage absorptions may be had; while at the same time, indications of the absorption peaks throughout the remaining portion of the full range of percentage absorptions, may be also indicated on the same graph. Thus for example, by employing a wedge structure having a window constructed in accordance with the FIGURE 2 illustration, a graph may be obtained that is in accordance with the FIGURE 5 illustration. It will be noted that the absorption peaks A, B and G are amplified nearly as much as was the case in FIGURE 4; but, the absorption peaks C, D, E and F are also indicated on the graph. It is merely necessary to take into account the distortion of the percentage transmission scale which occurs at the eighty percent level of the transmission range, when reading the results.

Referring again to FIGURE 2, it will be observed that there is a cam actuated switch structure schematically indicated. This switch structure includes a cam bump 78 on the top edge of the window 28. To be actuated by the cam rise 78, there is a roller 79, which in turn carries a cam follower element 80 thereon. Cam roller 79 is biased into contact with, and rolls along, the top edge of the wedge 28. When the cam surface 78 moves under the roller 79, the follower element 80 is moved upward into contact with a lever arm 84 that is carried by any convenient switch supporting structure, such as that schematically indicated at 85. Thus, a switch 86, will be actuated by the movement of the arm 84. It will be noted that the cam rise-surface 78 is located directly above the junction point between the wedge shaped panel 70 and the tapered panel 71.

The cam actuated switch structure described above, is employed for providing a switchover in the gain of the system from a high gain condition for the amplified portion of the output to a low gain condition for the remaining porion of the full range of percentage transmission. The details of this switchover arrangement for changing the gain of the system, are not shown since they form a standard part of the motor control system, and as such form no part, per se, of the invention. It will be appreciated that with the cam structure illustrated, the lever arm 84 is only momentarily actuated as the transition point is passed in either direction. Therefore the switchover arrangement must be appropriately set up. If it should be desired, the cam structure could be changed to make the lever arm remain actuated so long as the tapered panel is in registration with the beam. In the latter event the swichover arrangement would be differently set up, to suit.

It is pointed out that a mechanical change-of-system gain (not shown) might be accomplished, as for example by employing any feasible structure. Thus the illustrated electrical switch arrangement for shifting gain of the system, is merely one which is most readily adaptable to the type of electric motor drive system which has been illustrated in FIGURE 1.

While a particular embodiment of the invention has been described in considerable detail in accordance with the applicable statutes, this is not to be taken as in any way limiting the invention but merely as being descriptive thereof.

What is claimed as the invention is:

1. In combination with a double beam spectrophotometer having a window with a graduated opening movably positioned in the path of one beam thereof for limiting the passage to a predetermined percentage of the energy in said beam depending upon the relative positions of said opening and said beam, said window opening having dimensions such that the maximum and minimum percentages of energy passed thereby are substantially one hundred and zero percent respectively, the improvement comprising first blocking means in said window for causing a first linear change in the percentage of energy passed through said opening over a part of the movement of the window, the maximum percentage of energy of said first linear change being different in relative magnitude from the ratio of said part to said full movement of the window in order to cause an amplified output, second blocking means for causing a second linear change in the percentage of energy passed through said opening over the remaining part of said full movement of the window, said second linear percentage change being complimentary to said first linear percentage change so that the sum of said first and second percentage changes covers the entire percentage change from substantially one hundred percent to zero.

2. In combination with a double beam spectrophotometer having a window with a graduated opening movably positioned in the path of one beam thereof for limiting the passage to a predetermined percentage of the energy in said beam depending upon the relative positions of said opening and said beam, said window opening having dimensions such that the maximum and minimum percentages of energy passed thereby are substantially one hundred and zero percent respectively, the improvement comprising first opaque means in said opening for linearly reducing the percentage of energy passed from substantially one hundred percent to only a small percentage less than one hundred percent, said first opaque means extending over more than half of the full window movement, second opaque means in said opening and complimentary to said first opaque means for linearly reducing the percentage of energy passed from said small percentage less than one hundred percent to zero percent over the remaining portion of the window movement.

3. In combination with a double beam spectrophotometer having a window with a graduated opening movably positioned in the path of one beam thereof for limiting the passage to a predetermined percentage of the energy in said beam depending upon the relative positions of said opening and said beam, said window opening having dimensions such that the maximum and minimum percentages of energy passed thereby are substantially one hundred and zero percent respectively, the improvement comprising a parallel sided boundary configuration for said window opening, a wedge shaped opaque panel extending longitudinally from the one hundred percent end of said opening toward the other end thereof, the maximum width of said panel being only a relatively small percentage of the full distance between the parallel sides of said boundary, the length of said panel being a substantial amount of the full length of said boundary configuration, so that the readings of said spectrophotometer are amplified in the upper percentage of energy passed that is determined by the percentage of said panel width relative to said one hundred percent distance between said parallel sides, a tapered opaque panel connected to the other end of said wedge shaped panel, said tapered panel extending the remainder of the way to the zero percent end of said boundary configuration and having a maximum width equal to the full distance between the parallel sides of said boundary, so that the readings of said spectrophotometer include the full substantially one hundred percent to zero range of percent energy passed, said tapered panel being positioned in the path of said beam during the remainder of the percentage of energy passed that lies outside said range of readings that are amplified.

4. The invention according to claim 3 wherein said opaque panels are co-axial and have the axes thereof midway between the parallel sides of said boundary configuration.

5. In combination with a double beam spectrophotometer having a window with a graduated opening movably positioned in the path of one beam thereof for limiting the passage to a predetermined percentage of the energy in said beam depending upon the relative positions of said opening and said beam, said window opening having dimensions such that the maximum and minimum percentages of energy passed thereby are substantially one hundred and zero percent respectively, the improvement comprising first blocking means in said window for expanding the sensitivity over part of the full zero to one hundred percentage range, second blocking means for including the entire remainder of the full zero to one hundred percentage range in the remaining part of the window opening, and means actuated by said window for controlling a shifting of the system gain at the point of transition from the expanded sensitivity part of the range to the remaining part of the range and back.

6. In combination with a double beam spectrophotometer having a window with a graduated opening movably positioned in the path of one beam thereof for limiting the passage to a predetermined percentage of the energy in said beam depending upon the relative positions of said opening and said beam, said window opening having dimensions such that the maximum and minimum percentages of energy passed thereby are substantially one hundred and zero percent respectively, the improvement comprising a parallel sided boundary configuration for said window opening, a wedge shaped opaque panel extending longitudinally from the substantially one hundred percent end of said opening toward the other end thereof, the maximum width of said panel being only a relatively small percentage of the full distance between the parallel sides of said boundary, the length of said panel being a substantial amount of the full length of said boundary configuration, so that the readings of said spectrophotometer are amplified in the upper percentage of energy past a tapered opaque panel connected to the other end of said wedge shaped panel, said tapered panel extending the remainder of the way to the zero percent end of said boundary configuration and having a maximum width equal to the full distance between the parallel sides of said boundary, so that the readings of said spectrophotometer include the full one hundred percent to zero range of percent energy passed, said tapered panel being positioned in the path of said beam during the remainder of said full range that lies outside said range of readings that are amplified, and means associated with said boundary configuration and located at the point along the length thereof corresponding to the connection of said wedge shaped panel with said tapered panel for controlling a shift in the system gain from relatively high gain in said amplified range to relatively low gain in said remainder of the range.

References Cited in the file of this patent

UNITED STATES PATENTS

| | | |
|---|---|---|
| 2,120,654 | Spence et al. | June 14, 1938 |
| 2,311,159 | Dimmick | Feb. 16, 1943 |
| 2,817,769 | Siegler et al. | Dec. 24, 1957 |
| 2,885,926 | Molloy | May 12, 1959 |